(12) United States Patent
Fernandez

(10) Patent No.: US 9,863,148 B2
(45) Date of Patent: Jan. 9, 2018

(54) SHEATH-BASED ROLLABLE LENTICULAR-SHAPED AND LOW-STICTION COMPOSITE BOOM

(71) Applicant: The United States of America as represented by the Administrator of the National Aeronautics and Space Administration, Washington, DC (US)

(72) Inventor: Juan M. Fernandez, Norfolk, VA (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

(21) Appl. No.: 15/245,515

(22) Filed: Aug. 24, 2016

(65) Prior Publication Data

US 2017/0058524 A1   Mar. 2, 2017

Related U.S. Application Data

(60) Provisional application No. 62/211,248, filed on Aug. 28, 2015.

(51) Int. Cl.
*E04H 12/18* (2006.01)
*E04C 3/00* (2006.01)
(Continued)

(52) U.S. Cl.
CPC .............. *E04C 3/005* (2013.01); *B29C 65/48* (2013.01); *B64G 1/222* (2013.01); *B29L 2023/001* (2013.01)

(58) Field of Classification Search
CPC ......... E04C 3/005; B29C 65/48; B64G 1/222; B29L 2023/001
(Continued)

(56) References Cited

U.S. PATENT DOCUMENTS 2,352,526 A * 6/1944 Farrand .................. A47B 13/00
52/108
3,298,142 A * 1/1967 Isaac ....................... B64C 27/46
137/355.26
(Continued)

OTHER PUBLICATIONS

Fernandez, J.M. et al., Deployment Mechanisms of a Gossamer Satellite Deorbiter, 15th European Space Mechanisms & Tribology Symposium—ESMATS 2013. Sep. 25-27, 2013, pp. 1-8, The Netherlands.
(Continued)

*Primary Examiner* — Basil Katcheves
(74) *Attorney, Agent, or Firm* — Andrea Z. Warmbier; Robin W. Edwards; Mark P. Dvorscak

(57) ABSTRACT

Various embodiments provide rollable and deployable composite booms that may be used in a wide range of applications both for space and terrestrial structural solutions. Various embodiment composite booms may be bistable, i.e. having a stable strain energy minimum in the coiled configuration as well as the in the deployed configuration. In various embodiments, a boom may be fabricated by aligning two independent tape-springs front-to-front encircled by a durable seamless polymer sleeve. The durable seamless polymer sleeve may allow the two tape-springs to slide past each other during the coiling/deployment process so as to reduce, e.g., minimize, shear and its derived problems.

19 Claims, 8 Drawing Sheets

(51) Int. Cl.
*B64G 1/22* (2006.01)
*B29C 65/48* (2006.01)
*B29L 23/00* (2006.01)

(58) Field of Classification Search
USPC .......................................... 52/108; 138/119
See application file for complete search history.

(56) References Cited

U.S. PATENT DOCUMENTS

| | | | | |
|---|---|---|---|---|
| 3,360,894 A * | 1/1968 | Orr | ...................... | E04C 3/005 138/166 |
| 3,387,414 A * | 6/1968 | Adams | ................... | E04C 3/005 206/216 |
| 3,434,254 A * | 3/1969 | Rubin | ..................... | B64G 9/00 138/119 |
| 3,434,674 A * | 3/1969 | Groskopfs | ............... | B64G 9/00 242/390.2 |
| 3,508,587 A * | 4/1970 | Mauch | .................. | F16L 11/121 138/119 |
| 3,648,895 A * | 3/1972 | Strazdins | ............... | B65D 35/04 138/119 |
| 3,749,133 A * | 7/1973 | Bochory | ............... | F16L 11/121 138/119 |
| 3,862,528 A * | 1/1975 | Meissinger | ............. | E04C 3/005 242/390.2 |
| 4,470,608 A * | 9/1984 | Warren | .................. | F16J 15/024 277/645 |
| 6,177,627 B1 * | 1/2001 | Murphy | .................... | F24J 2/10 136/245 |
| 6,217,975 B1 | 4/2001 | Daton-Lovett | | |
| 7,895,795 B1 | 3/2011 | Murphey et al. | | |
| 8,776,451 B2 * | 7/2014 | Watanabe | .............. | B64G 1/222 182/69.4 |
| 2014/0230949 A1 | 8/2014 | Daton-Lovett | | |
| 2016/0177567 A1 * | 6/2016 | Gandhi | .................... | B64G 9/00 52/108 |

OTHER PUBLICATIONS

Fernandez, J.M., et al., Bistable Over the Whole Length (BOWL) CFRP Booms for Solar Sails, Proceedings of the Third International Symposium on Solar Sailing, Jun. 11-13, 2013, pp. 1-20, University of Strathclyde, Glasgow, Scotland.

Galletly, D. et al., "Bistable composite slit tubes. I. A beam model," International Journal of Solids and Structures, 2004, pp. 4517-4533, vol. 41.

Galletly, D. et al., "Bistable composite slit tubes. II. A shell model," International Journal of Solids and Structures, 2004, pp. 4503-4516, vol. 41.

Guest, S.D. et al., Analytical models for bistable cylindrical shells, Proceedings of the Royal Society A, 2006, pp. 839-854, vol. 462.; accessed on Aug. 12, 2016 http://rspa.royalsocietypublishing.org/.

Seffen, K.A. et al., Deployment dynamics of tape springs, Proceedings of the Royal Society A, pp. 1003-1048, 1999, vol. 455, The Royal Society.

NASA, NASA SP-8065, Tubular Spacecraft Booms, pp. 1-54, Feb. 1971.

Iqbal, K., et al., Bi-stable composite shells, 41st Structures, Structural Dynamics, and Materials Conference, Apr. 2000, AIAA-2000-1385, Atlanta, Georgia.

Herbeck, L., et al., Development and test of deployable ultra-lightweight CFRP-booms for a solar sail, European Conference on Spacecraft Structures, Materials, and Mechanical Testing, pp. 1-6, Nov. 2000, Noordwijk. The Netherlands.

Murphey, T.W. et al., High Strain Composites, AIAA SciTEch, pp. 1-53, Jan. 5-9, 2015, AIAA 2015-0942, Kissimmee, Florida.

Lappas, V. et al., CubeSail: A low cost CubeSat based solar sail demonstration mission, ScienceDirect, Advances in Space Research 48, 2011, pp. 1890-1901.

Fernandez, J., et al., CubeSail: A Low-Cost Nano-Solar Sail for Space Debris Reduction in LEO, 1st IAA Conference on University Satellite Missions, Jan. 24-26, 2011, Rome, Italy.

Adeli, S. Nasir, Deployment System for the CubeSail nano-Solar Sail Mission, Aug. 2010, 24th ASU/AIAA Conference on Small Satellites, Logan, USA.

* cited by examiner

SHEATH-BASED ROLLABLE LENTICULAR-SHAPED AND LOW-STICTION COMPOSITE BOOM

CROSS-REFERENCE TO RELATED APPLICATIONS

This patent application claims the benefit of and priority to U.S. Provisional Patent Application No. 62/211,248, filed Aug. 28, 2015, the contents of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Non-traditional spacecraft, such as small satellites and nanosatellites, are increasing in their rate of use for space based research, science, and technology demonstration. These small satellites and nanosatellites, such as CubeSats, are often constrained in stowed (i.e., pre-deployment) size and weight, requiring the deployables for small satellites and nanosatellites to fit within small stowage spaces. Thus, the deployment and support structures for the deployables also need to fit within small stowage spaces for small satellites and nanosatellites making traditional support structures, such as telescopic or foldable booms, difficult to use in small satellite and nanosatellite applications. The inability of traditional rigid or telescopic booms to meet the requirements of small satellite and nanosatellite applications has driven the development of rollable booms. However, conventional rollable booms using bonded structures, such as the Triangular Rollable And Collapsible (TRAC) boom and Collapsible Tubular Mast (CTM) boom, suffer from a host of problems during stowage including kinks, local buckling, packaging inefficiencies, delamination, cracking, axial curvature development during storage, deployment blossoming, etc. Therefore, a rollable boom that addresses one or more of these problems is needed.

BRIEF SUMMARY OF THE INVENTION

Various embodiments provide rollable and deployable composite booms that may be used in a wide range of applications both for space and terrestrial structural solutions. Various embodiment composite booms may be bistable, i.e. having a strain energy minimum in the coiled configuration as well as the in the deployed configuration. This bistable feature of various embodiments may simplify the stowage process with a reduction in the size and complexity of the deployment mechanism when compared with conventional rollable booms. Additionally, the bistable nature of various embodiments may yield a more coherent and controllable extension of a boom upon release of its constraints when compared with conventional rollable booms. Various embodiments enable a lightweight boom structure that may be stowed on a reel without appreciable shear stresses developing in the boom's constitutive composite parts. This allows for unprecedentedly small coiling diameters for the total thickness of the boom structure, which may enable highly compact designs such as those required for applications in small satellites and nanosatellites, such as CubeSats.

In various embodiments, a boom may be fabricated by aligning two independent tape-springs front-to-front encircled by a durable seamless polymer sleeve. The durable seamless polymer sleeve may allow the two tape-springs to slide past each other during the coiling/deployment process so as to reduce, e.g., minimize, shear and its derived problems, especially when compared with conventional rollable booms.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments are discussed herein in relation to "small satellites" and "nanosatellites". The terms "small satellites" and "nanosatellites" are used merely as example use cases to better illustrate aspects of the various embodiments, and are not intended to limit the scope of the disclosure or claims. The various embodiments may be applicable to other uses cases, both in space and terrestrial applications, and other applications for booms may be substituted in the various embodiments.

Figure 1:
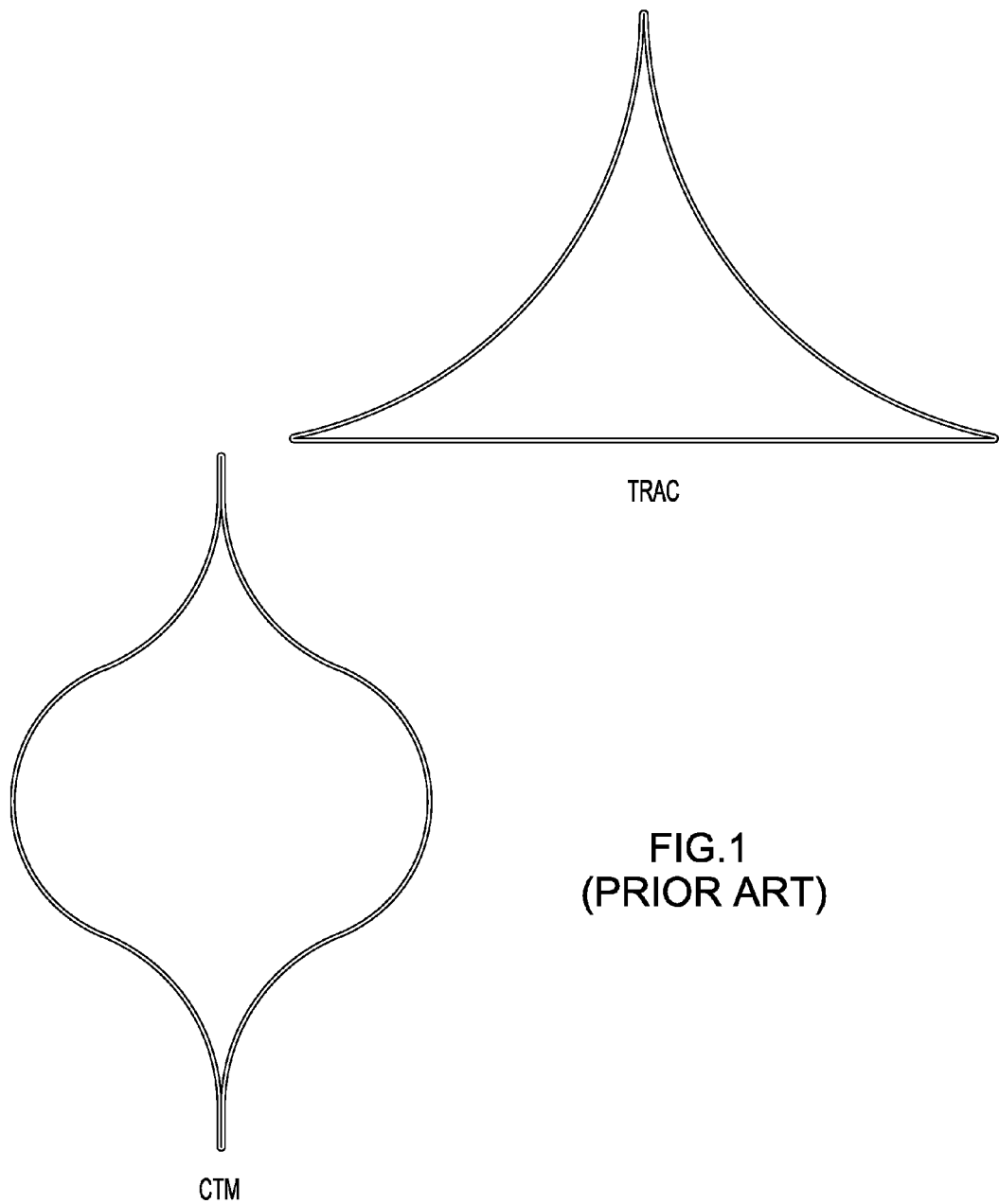
FIG. 1 shows photographs of a conventional CTM boom and a TRAC boom.
Figure 2:
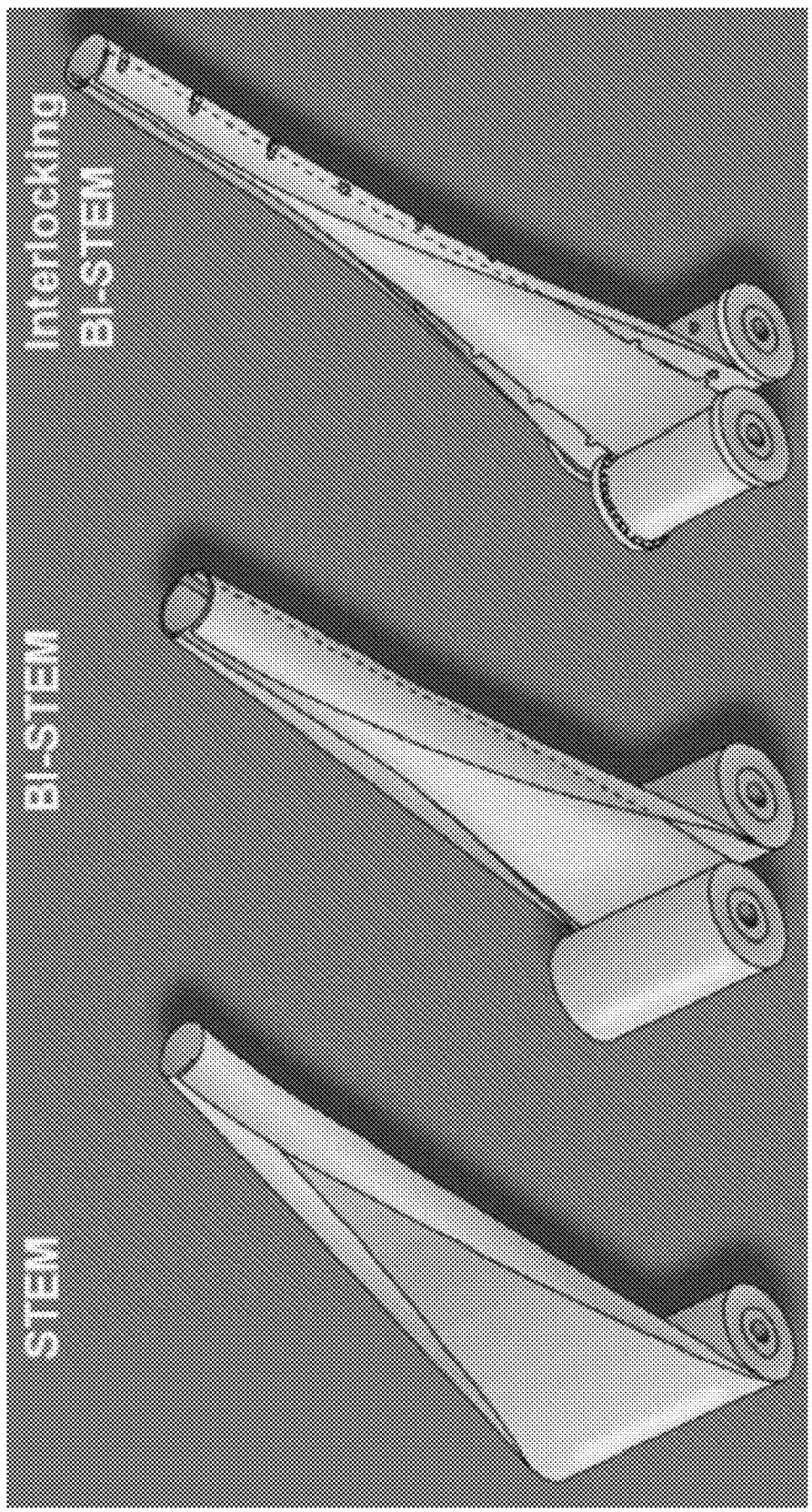
FIG. 2 illustrates conventional STEM, BI-STEM, and interlocking BI-STEM booms.

Conventional rollable booms, such as the Triangular Rollable And Collapsible (TRAC) boom and Collapsible Tubular Mast (CTM) boom, are formed by bonding/welding their two half-sides to increase the moment of inertia. For example, a conventional CTM boom and a TRAC boom are illustrated in FIG. 1. These conventional rollable booms suffer from a host of challenges. For example, the shear stresses generated during the coiling process tend to form kinks in the half-side that undergoes compression causing local buckling at the edges in conventional rollable booms. This has a negative effect towards the packaging efficiency of conventional rollable booms, and also creates a delamination or crack initiation point at the bonded area. Another example of a challenge with conventional rollable booms is that the minimum allowable coiling diameter to avoid plastic deformation or fracture during storage for a given total thickness of the boom, which may be dictated by strength/stiffness requirements, sometimes does not comply with mission volume requirements for conventional rollable booms. Conventional rollable booms provide no optimized solution for the usually conflicting requirements of the deployed (high stiffness) and stored (low stiffness and high strain to failure) configurations. Conventional rollable booms, specifically bonded booms, are therefore very limited in thickness if the conventional rollable booms want to be compactly stored into very small volumes. As another example, when using composites materials, in general, the bonding of the half-sides is achieved through the use of adhesives in conventional rollable booms. However, the bonding adhesives are prone to creep as the load path in shear is through the adhesive that is not as stiff or has the shear strength of the half-sides. Therefore, over time a packaged conventional rollable boom can develop a significant axial curvature (bow) that would reduce, for example, the conventional rollable boom's buckling load once deployed. Other conventional booms with non-bonded edges, such as the Storage Tubular Extendible Member (STEM) booms, have a very low moment of inertia per unit of stored height and have a long coiled to deployed transition region requiring large volumes for storage. The Bi-STEM boom that nests two smaller STEM booms, which was designed to reduce the packaged height of STEM booms, still suffers from the low torsional stiffness of being an open section structure. The interlocking Bi-STEM boom, although increasing the torsional stiffness of the boom by interlocking its free edges, requires complex mechanisms to assure the locking features properly engage. Also, the Bi-STEM family of booms require one reel per STEM hindering compact designs. FIG. 2 shows conventional STEM, BI-STEM, and interlocking BI-STEM booms. As a further example, expansion of a conventional rollable boom coil during deployment, which is technically known as "blossoming" is a problem with conventional rollable booms. Blossoming is a phenomenon that consists of an unwinding of the boom coil from the inside such that the boom coil does not behave like a solid any longer incurring in relative motion between the inner and outer windings of the coil and that can lead to boom extension failure by jamming inside the deployment mechanism. Additionally, conventional rollable booms suffer from problems in coating their surfaces due to their complex shape structure, which reduces the environmental protection (e.g., thermal, radiation, atomic oxygen, etc.) that can be afforded to conventional rollable booms. Various embodiments provide bistable rollable and deployable composite booms that may addresses one or more of the problems with conventional rollable booms noted above.

Various embodiments provide rollable and deployable composite booms that may be used in a wide range of applications both for space and terrestrial structural solutions. The composite booms may be bistable, i.e., having a stable strain energy minimum in the coiled configuration as well as in the deployed configuration. This bistable feature may simplify the stowage process with a reduction in the size and complexity of the deployment mechanism when compared with conventional reliable booms. Additionally, the bistable nature of the various embodiments may yield a more coherent and controllable extension of a boom upon release of its constraints when compared with conventional rollable booms. A lightweight boom structure may be stowed on a reel or spindle without appreciable shear stresses developing in the boom's constitutive composite parts. This allows for unprecedentedly small coiling diameters for the total thickness of the boom structure, which may enable highly compact designs such as those required for applications in small satellites and nanosatellites, such as CubeSats.

In various embodiments, a boom may be fabricated by aligning two independent tape-springs front-to-front encircled by a durable seamless polymer sleeve (also referred to as a sheath). The durable seamless polymer sleeve may allow the two tape-springs to slide past each other during the coiling/deployment process so as to reduce, e.g., minimize, shear and its derived problems, especially when compared with conventional rollable booms (This can be seen on FIG. 3, discussed below, where the outer tape-spring 104 has moved inward of the sleeve 102 during coiling and the inner tape-spring 104 has moved outward of the sleeve 102 creating an offset between the two.) The offset may be proportional to the boom length and thickness and the initial coiling diameter. During deployment this offset will reduce until it becomes zero at the end of extension.

The various embodiment booms' bistable nature helps reduce the embodiment boom's tendency to blossom, as the latter is directly related to the level of strain energy of the stored configuration and the stored configuration of an embodiment bistable boom is a stable energy minimum shape.

The various embodiment composite booms may be shearless, providing a rollable structure with a large moment of inertia per united of stored height that may not suffer from shear derived problems. In various embodiments, the low-friction polymer sleeve encircling the tape-springs allows the inner tape-springs to slide relative to each other during the coiling/deployment stages, minimizing the shear stresses in the structure. In addition, since the two tape-springs are not bonded, the allowable coiling diameter that the various embodiments may achieve may be at least halved when compared to a bonded/welded boom of the same total thickness, enabling more compact designs when compared with conventional rollable booms.

In various embodiments, the polymer sleeve of the boom may be a low-stiction polymer sleeve, and may be formed from a seam-less tubing, Previously tested tubing made from spirally wound tapes, that have a spiral seam, seems to be more prone to permanent plastic deformation (axial curvature) of the sheath itself. This is possibly a result of some elastic relaxation (creep) developing in the adhesive of the seams during the storage period. Therefore, a seam-less tubing may be the preferred form for the sheath. However, the sheath need not be seam-less, and therefore either seam-less or seamed tubing may be used. In various embodiments, the seam-less (or seamed) tubing may be flattened about the diameter of the polymer sleeve, and the two resulting permanent creases may be formed in the polymer sleeve, thereby forming the polymer sleeve with a lenticular form. The sleeves may be formed from any application-suitable polymeric material, including Kapton, Teflon, Fluorinated Ethylene Propylene (FEP), etc. The sleeves may be coated with additional materials, such as vapor deposited aluminum (VDA), Chromium, or silicon dioxide ($SiO_2$), etc. The coating of the sleeves may provide additional environmental protection (e.g., thermal, radiation, atomic oxygen, etc.). For example, the use of the polymer sleeve may be a way of controlling the overall thermal behavior of the boom as the sleeve may be easily coated with optimal thermal coatings, such as Aluminum or Silver. The polymer sleeves may also be readily coated with radiation and atomic oxygen resistant materials like silicon dioxide ($SiO_2$).

Figure 3:
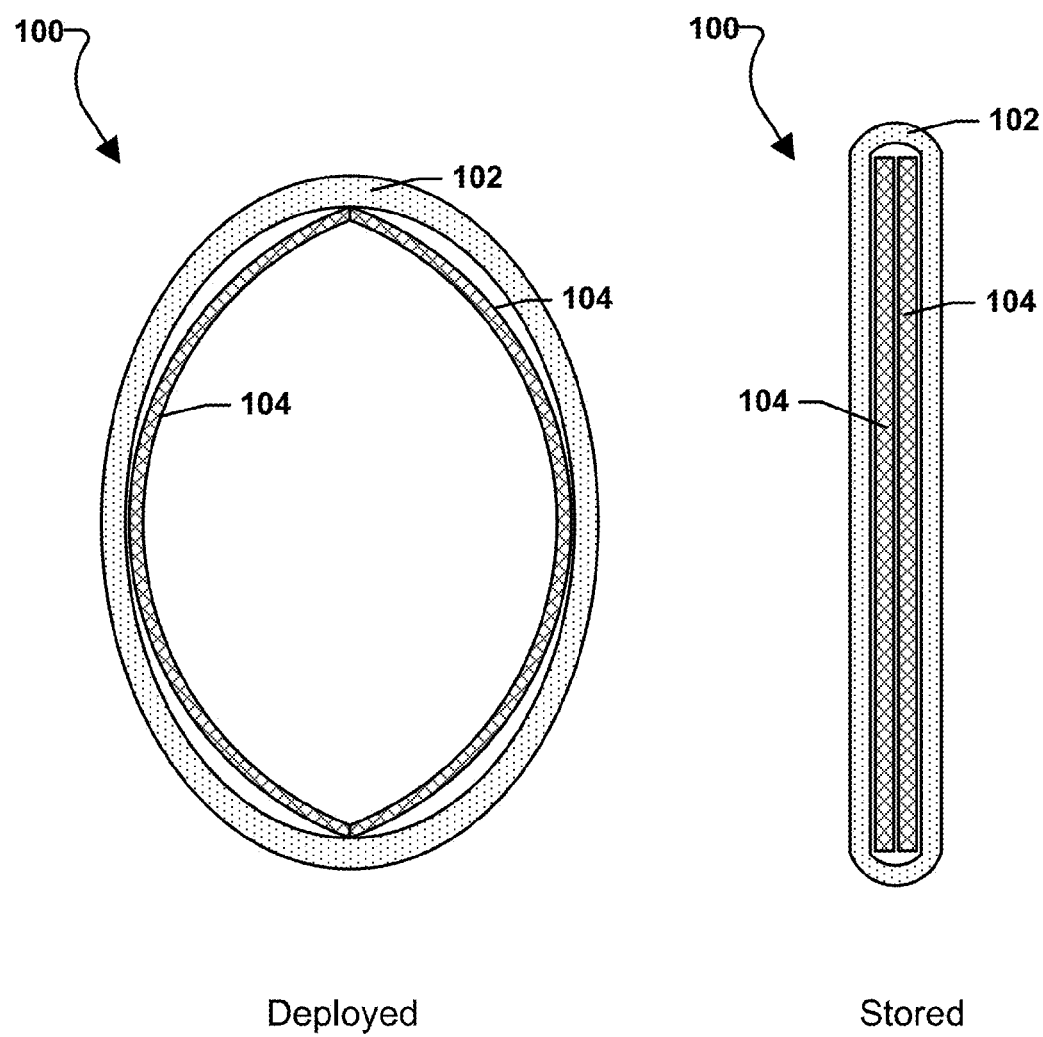
FIG. 3 shows cutaway views of an embodiment bistable composite boom in a deployed and stored configuration.
Figure 4:
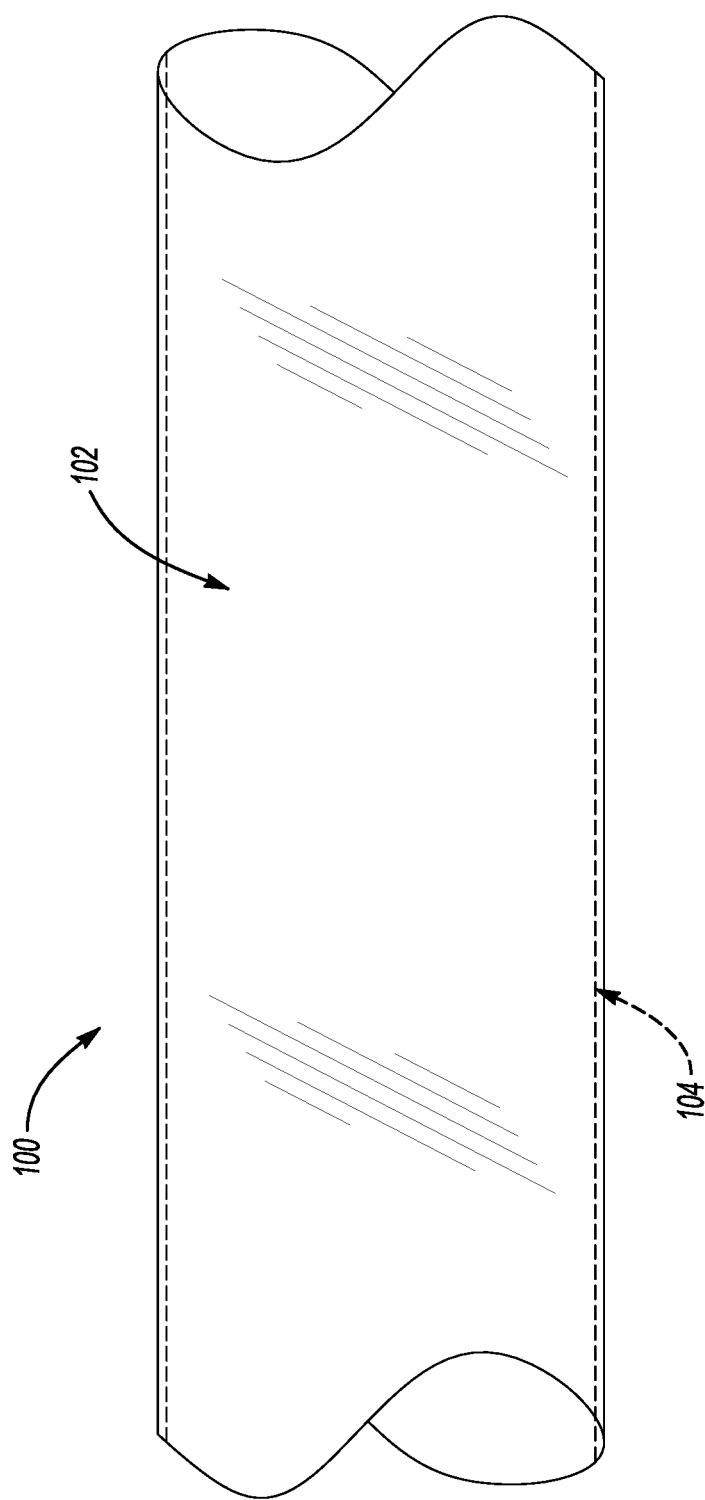
FIG. 4 is a photograph of an embodiment boom with the longitudinal edges of the tape-springs shown coupled throughout the entire length within a clear sleeve.
Figure 5:
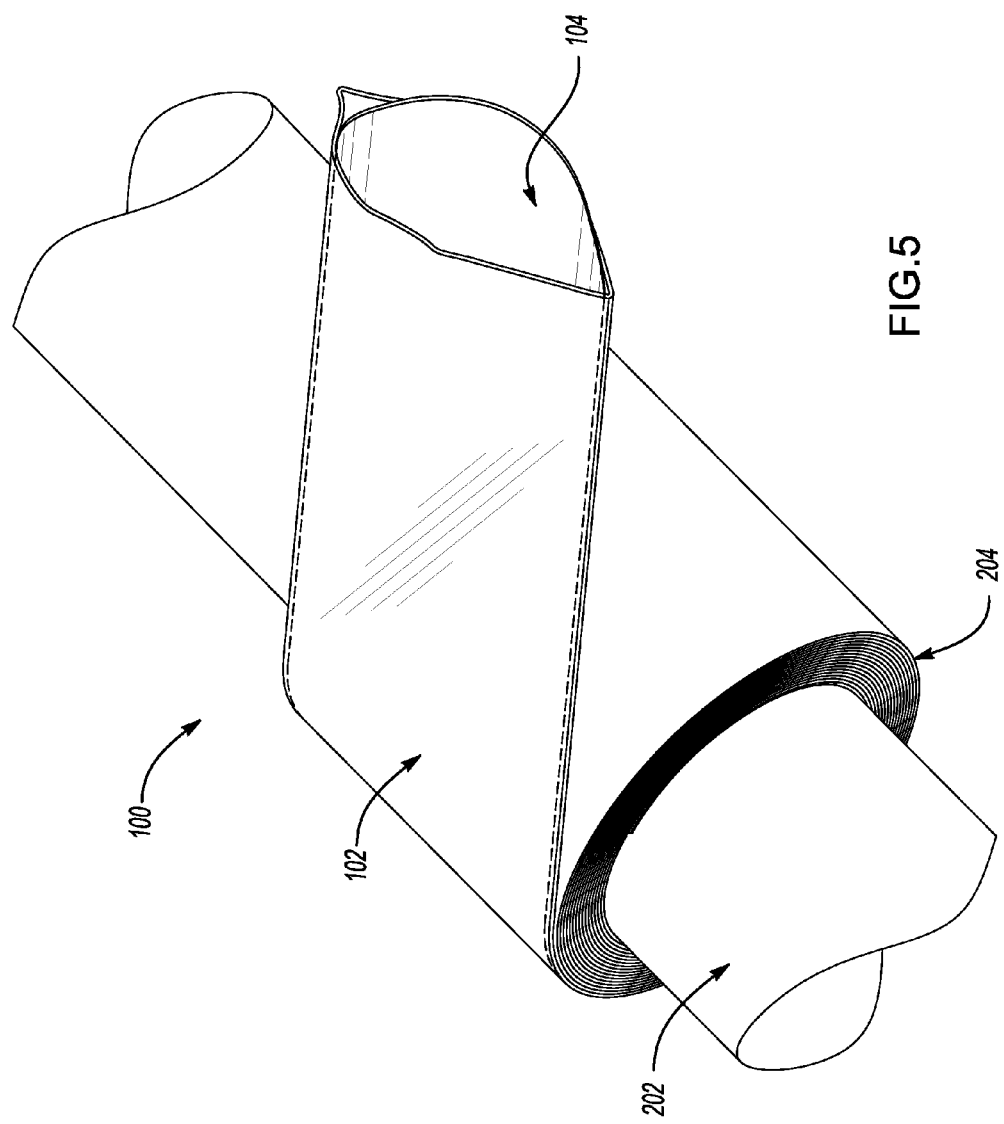
FIG. 5 is a photograph of an embodiment bistable composite boom in a stored configuration.
Figure 7:
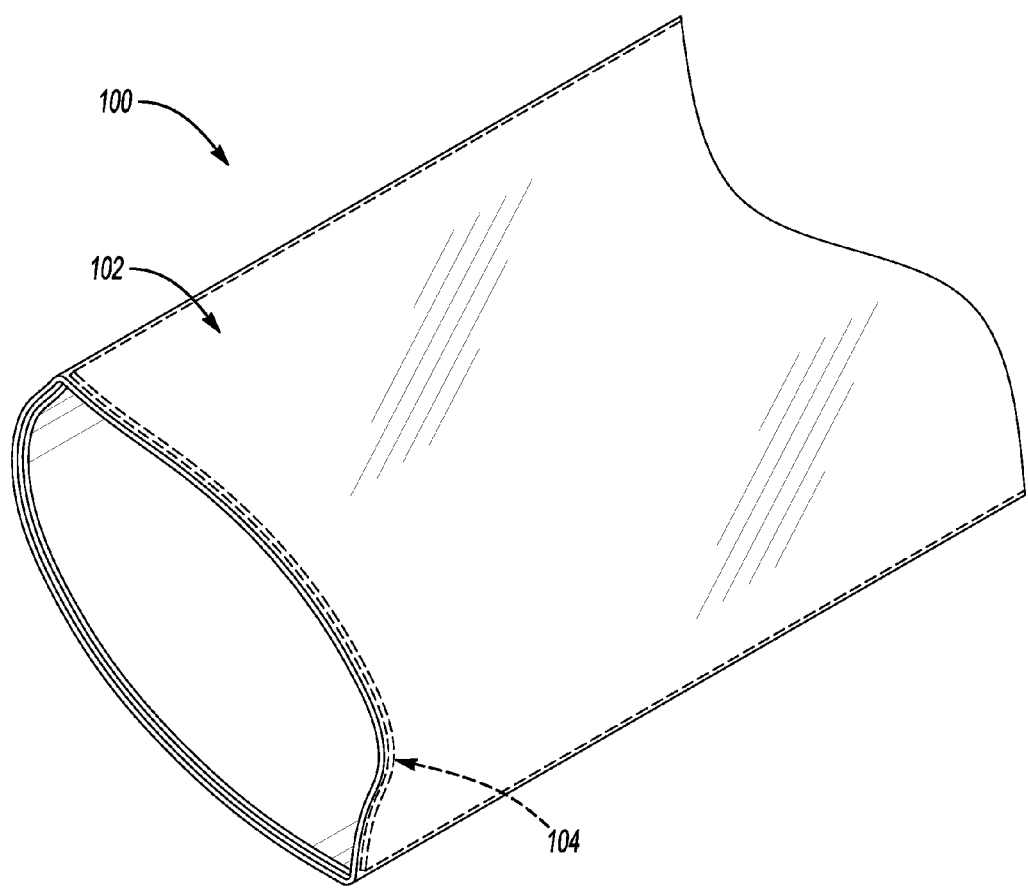
FIG. 7 is a photograph of an embodiment bistable composite boom in a deployed configuration.

In various embodiments, bistable composite booms may be fabricated by sliding two tape-springs inside the polymer sleeve, for example, one at a time, such that the top and bottom edges of the two inner tape-springs may align with the sleeve creases, such as the creases formed when the sleeve was flattened about its diameter. The tape-springs may be made from any application-suitable material, including Carbon Fiber Reinforced Polymer (CFRP), Fiber Reinforced Plastics (FRPs), Carbon Fiber Reinforced Plastic, Glass Fiber Reinforced Plastic or Kevlar Reinforced Plastic, etc. Each tape-spring may be made from the same material, or each tape-spring may be made from different materials. FIG. 3 illustrates cutaway views of such an embodiment bistable composite boom 100. The tape-springs 104 may be encircled by the sleeve 102. The tape-springs 104 may not be bonded, welded, or otherwise structurally affixed to one another. The lack of bonding, welding, or otherwise structurally affixing the tape-springs 104 may allow the tape-springs 104 to slide relative to each other during the coiling/deployment stages of the boom 100, which may reduce, e.g., minimize, the shear stresses in the boom 100. In the deployed configuration, each tape-spring may subtend to expand the sleeve 102 creating a space between the tape-springs 104 inside the sleeve 102. In the deployed configuration, it may also be preferable that the longitudinal edges of the tape-springs 104 face each other and get coupled throughout the entire length so as to increase the torsional stiffness of the boom structure. For example, FIG. 4 is a photograph of an embodiment boom with the longitudinal edges of the tape-springs 104 shown coupled throughout the entire length within the clear sleeve 102. In the stored (i.e., flattened and coiled) configuration, the tape-springs 104 may be straightened and the space between the tape-springs 104 may be reduced or eliminated, FIG. 5 is a photograph of the embodiment bistable composite boom 100 in a stored configuration coiled around a spindle 202. Coils 204 of the bistable composite boom 100, as well as the inner tape-spring 104 (i.e., the tape-spring 104 inward to the spindle 202 when coiled), are shown in FIG. 5. FIG. 7 is photograph of an embodiment bistable composite boom 100 in a deployed configuration. In FIG. 7, the sleeve 102 is clear, and the tape-springs 104 may be seen inside the sleeve 102.

In various embodiments, each tape-spring 104 may subtend to an angle less than 180°, such that the sum of both tape-spring 104 subtends may be less than 360°. Each tape-spring 102 may subtend to the same or different angles. The closer the subtended angle is to 180° the stiffer the boom 100 may be and the closer the two moments of area about the two principal axis may be. At 180°, the cross-section resembles a tube and flattening may become practically impossible. Subtended angles between 90° and 170° may be preferable over other subtended angles, but any subtend angle for a tape-springs 104 less than 180°, such as any angle between 0° and 180°, may be used in the various embodiments.

Figure 6:
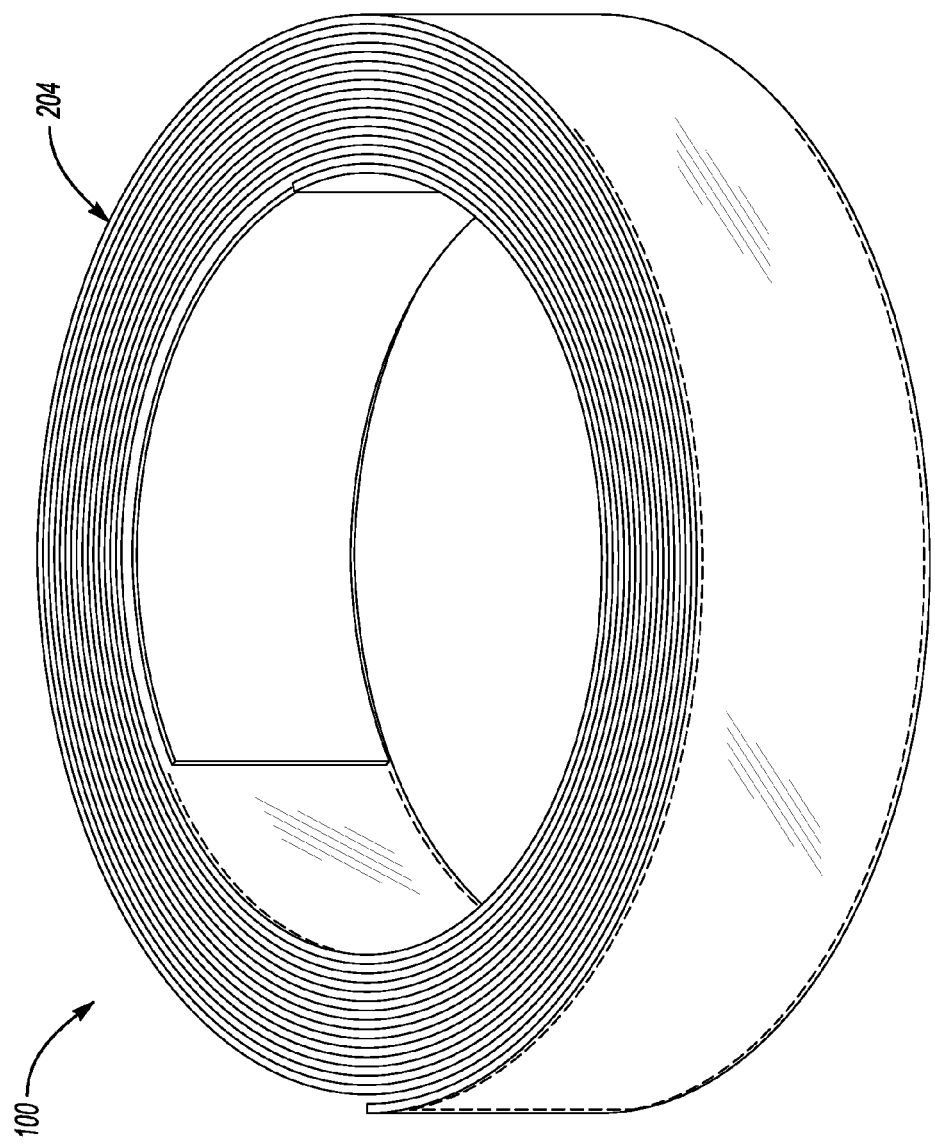
FIG. 6 is a photograph showing coils of the bistable composite boom in a stored configuration.
Figure 8:
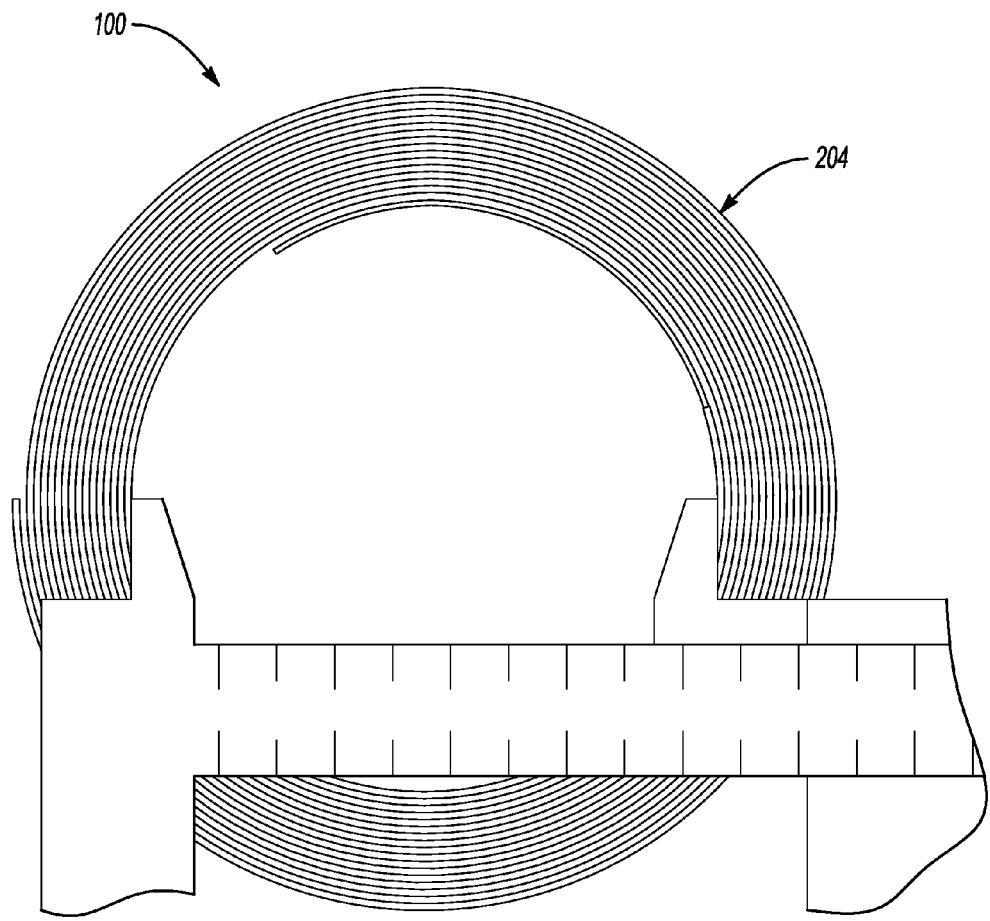
FIG. 8 is a photograph of another embodiment bistable composite boom in a stored configuration.

To produce a bistable version of a shearless composite boom 100, in various embodiments, the outer spring 104 (i.e., the tape-spring 104 located outside of the inner tape-spring 104, such that the inner tape-spring is between the spindle 202 and outer tape-spring 104 when coiled) may be a bistable laminate. For example a [±45, 0/±45] lay up may yield a bistable tape-spring 104. As is well known in the art, lay ups of composite structures may be represented as ±fiber orientation angles for each ply or layer of the lay up relative to a primary axis, in this case the axial direction of the boom 100. For example, FIG. 6 shows coils 204 of the bistable composite boom 100. In various embodiments, the inner tape-spring 104 may not have a bending stiffness in the boom 100 axis direction larger than that of the outer tape-spring 104. The diameter which the bistable boom 100 may tend to naturally coil about in a stable way may depend upon the ratio of the bending stiffness of the two tape-springs 104 in the axial direction. For a very thin inner tape-spring 104 with a low bending stiffness in the axial direction, the natural stable diameter of the boom 100 may approach that of the stable diameter of the outer tape-spring 104 if the outer tape-spring was to be coiled on its own. FIG. 8 shows another embodiment of the bistable composite boom 100. For example, the boom 100 may have a [45, 0/±45] lay up outer tape-spring and the inner tape-spring may be thinner and less stiff than the outer tape-spring, with the result being that the above-described inner to tape-spring 104 is not bistable.

In various embodiments, the final cross-section shape of the boom 100 may be lenticular and flexible enough to allow elastic flattening and subsequent coiling around a cylindrical reel drum, such as spindle 202. The tightly fitted sheath/sleeve couples both tape-springs 104 such that the total moment of area of the structure once deployed may be approximated as the sum of the two individual components about the new center of mass, which now also passes through the shear center and thus decouples bending and torsional deformations. Hence, the final boom 100 may be symmetrical about the two principal axis of the cross section. After initial testing it was assessed that the torsional stiffness of the deployed boom 100 was also greatly increased and becomes two orders of magnitude larger than that of the individual tape-spring 104 components alone. In addition, initial tests carried out on an exemplary boom have demonstrated that the torsional stiffness of the deployed structure drops only by 50-70% in a worst case scenario where the edges of the tape-springs 104 are completely decoupled.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A bistable composite boom having a coiled configuration in which the bistable composite boom is roiled onto a spindle and a deployed configuration in which the composite boom is unrolled from the spindle, the bistable composite boom comprising:
   a polymer sleeve flattened in the coiled configuration to form two permanent creases, the two permanent creases providing the bistable composite boom with a lenticular cross-section when the bistable composite boom is in the deployed configuration;
   a first tape-spring that is not bistable; and
   a second tape-spring that is bistable, wherein:
      with respect to the spindle in the coiled configuration, the first tape-spring forms an inner tape-spring and the second tap spring forms an outer tape-spring;
      the first and second tape-springs are encircled by the polymer sleeve without being structurally affixed together; and
      the first and second tape-springs slide relative to one another inside the polymer sleeve during coiling and deployment of the bistable composite boom;
   wherein the bistable composite boom is shearless and has a predetermined stable strain energy minimum in the coiled and deployed configurations.

2. The composite boom of claim 1, wherein the first tape-spring is configured to subtend to a first angle and the second tape-spring is configured to subtend to a second angle to create a space between the first and second tape-springs inside the polymer sleeve during deployment of the bistable composite boom.

3. The bistable composite boom of claim 2, wherein the first angle and the second angle in the deployed configuration sum together to be less than 360 degrees.

4. The bistable composite boom of claim 3, wherein the first angle and the second angle in the deployed configuration are each between 90 degrees and 170 degrees.

5. The bistable composite boom of claim 2, wherein the polymer sleeve is a seamless polymer sleeve.

6. The bistable composite boom of claim 5, wherein the polymer sleeve comprised of Kapton, Teflon or Fluorinated Ethylene Propylene.

7. The bistable composite boom of claim 6, wherein the polymer sleeve is coated with Aluminum, Chromium, Silver or Silicon Dioxide.

8. The bistable composite boom of claim 2, wherein the first tape-spring has a bending stiffness in a composite boom axial direction less than that of the second tape-spring.

9. The bistable composite boom of claim 8, wherein the first and second tape-springs comprise Fiber Reinforced Plastics (FRPs).

10. The bistable composite boom of claim 8, wherein first tape-spring has a thickness that is less than a thickness of the second tape-spring.

11. The bistable composite boom of claim 1, wherein the first and second tape-springs are encircled by the polymer sleeve such that top and bottom edges of the first tape-spring and the second tape-spring align with the two permanent creases in the polymer sleeve.

12. A method for fabricating a bistable composite boom, the method comprising:
   aligning a non-bistable first tape-spring and a bistable second tape-spring independently front-to-front;
   flattening a polymer sleeve to thereby, create two permanent creases in the polymer sleeve, the two permanent creases providing the composite boom with a lenticular form in cross-section when the composite boom is in a deployed configuration;
   encircling the first tape-spring and second tape-spring with the polymer sleeve; and
   rolling the first and second tape-springs onto a cylindrical spindle to form a coiled configuration, such that with respect to the cylindrical spindle in the coiled configuration the first tape-spring forms an inner tape-spring and the second tape-spring forms an outer tape-spring.

13. The method of claim 12, wherein aligning the first tape-spring and the second tape-spring independently front-to-front comprises sliding the first tape-spring and the second tape-spring inside the polymer sleeve such that top and bottom edges of the first tape-spring and the second tape-spring align with the two permanent creases in the polymer sleeve.

14. The method of claim 13, wherein the first tape-spring and the second tape-spring are slid inside the polymer sleeve one at a time.

15. The method of claim 13, wherein the polymer sleeve is a seamless polymer sleeve.

16. The method of claim 15, wherein the polymer sleeve is comprised of Kapton, Teflon or Fluorinated Ethylene Propylene.

17. The method of claim 15, further comprising coating the polymer sleeve with Aluminum Chromium, Silver, or Silicon Dioxide.

18. The method of claim 13, wherein the first and second tape-springs comprise Fiber Reinforced Plastic.

19. The method of claim 12, the first and second tape-springs are not affixed structurally to one another.

* * * * *